United States Patent [19]

Ovadia

[11] Patent Number: 5,612,527
[45] Date of Patent: Mar. 18, 1997

[54] DISCOUNT OFFER REDEMPTION SYSTEM AND METHOD

[76] Inventor: Victor A. Ovadia, 1929 Boulevard, West Hartford, Conn. 06107

[21] Appl. No.: 414,281

[22] Filed: Mar. 31, 1995

[51] Int. Cl.⁶ .................................................. G06K 15/00
[52] U.S. Cl. ......................... 235/383; 235/375; 235/385; 395/201
[58] Field of Search .................................. 235/395, 383, 235/385; 364/401

[56] References Cited

U.S. PATENT DOCUMENTS

| | | | |
|---|---|---|---|
| 4,791,281 | 12/1988 | Johnsen et al. | 255/383 |
| 4,839,507 | 6/1989 | May | 235/381 |
| 4,872,113 | 10/1989 | Dinerstein | 364/401 |
| 4,882,675 | 11/1989 | Nichtberger et al. | 364/401 |
| 4,908,761 | 3/1990 | Tai | 364/401 |
| 4,949,256 | 8/1990 | Humble | 364/401 |
| 5,013,896 | 5/1991 | Ono et al. | 235/381 |
| 5,065,000 | 11/1991 | Pusic | 235/381 |
| 5,137,304 | 8/1992 | Silverschotz et al. | 235/375 |
| 5,146,067 | 9/1992 | Sloan et al. | 235/381 |
| 5,185,695 | 2/1993 | Pruchnickl | 235/385 |
| 5,198,644 | 3/1993 | Pfeiffer et al. | 235/383 |
| 5,369,571 | 11/1994 | Metts | 364/401 |

OTHER PUBLICATIONS

1995 Annual Report Symbol Technologies, Inc., month missing 1995 PDF417: *The New Symbol of Data Management*, Symbol Tech; (Date Unknown) *It's More Than . . . Data File*, Symbol Tech.
"Eyeing the consumer" pp. 63–66 of The Economist Apr. 22, 1989.

*Primary Examiner*—Donald T. Hajec
*Assistant Examiner*—Michael G. Lee
*Attorney, Agent, or Firm*—Perman & Green

[57] ABSTRACT

A system for redeeming discount offer flyers which are mailed, handed or otherwise distributed to potential customers, provides identifying indicia on the offer flyer/circulars which is used by a point of sale machine to identify items which are offered at a discount and then apply an appropriate credit to the purchased items. The system further resides in a method of tracking purchasing habits of individuals who receive and use the discount offer flyer by creating a data base file identified by the user name or residence address for items so purchased with the flyer/circular program.

20 Claims, 6 Drawing Sheets

| FILE NAME INDICIA DATA 41 | FILE NAME INDICIA DATA 41' | FILE NAME INDICIA DATA 41" | FILE NAME INDICIA DATA 41'" |
|---|---|---|---|
| ITEM A<br>ITEM B<br>ITEM C<br>ITEM D | | | |

FIG. 4

DISCOUNT OFFER REDEMPTION SYSTEM AND METHOD

CROSS-REFERENCE TO RELATED APPLICATIONS

The present invention relates to U.S. application Ser. No. 08/223,744, now U.S. Pat. No. 5,468,021 entitled, CARRY CARD OFFER STRIP, which is a divisional application of now U.S. Pat. No. 5,308,118 issued to Victor Ovadia on May 3, 1994.

BACKGROUND OF THE INVENTION

The present invention relates to a method for redeeming discount offers, and deals more particularly with an improvement in such methods whereby the method of redeeming discount offers causes the recipient to be identified in a system along with a record of items he or she purchased, and further resides in a method whereby point of sale redemption of discount offers are made using a distributed brochure/flyer medium which is identified using a computerized data system in which offers stored in memory are electronically referenced.

Discount offers are most often made available to users through the intermediary of paper coupons, which for example, may have printed matter awarding the bearer money off the involved purchase item, or by offering a percentage off the purchase price of the item, or even allowing the bearer to a buy one item and receive another one free. Such coupon offers are well established components of retail marketing. Coupons are issued by a manufacturer as an incentive to induce consumers to purchase that manufacturer's product. This is especially true for mass marketed products, such as food, health and beauty aids, over the counter drugs, household cleaning products, and hardware store items. Historically, most coupons are issued by national brand product manufacturers, but retail store chains, particularly grocery stores, are now using incentive coupon offers to promote store brand products that compete with the national brands. Most coupons are delivered to consumers as printed offers in newspapers and magazines, as free-standing inserts (FSI) in newspapers, as components in direct mail advertising programs, or they are given to consumers in stores, or are attached to or placed inside product packaging. Commonly, the consumer must cut out the coupons, sort them, and present the individual pieces of paper for redemption at the time of purchase. At the point of purchase, each coupon must further be checked to verify that it has not expired. Confirmation must be shown of the consumer's having actually purchased the item on the coupon, and the item purchased must be examined to be certain it is the correct size and quantity of the product. Traditionally, this was done manually, but it is now common to encode coupons with a universal product code (UPC), electronically scan them, and utilize a database file attached to the checkout register to ensure that the coupon is valid and the product purchased is eligible for a discount credit. Even with the use of electronic scanners and electronic sales registers, a cashier must still manually handle each coupon individually. Thus, the manual handling of coupons adds significantly to the cost of their use.

Coupons collected by the retailer must be sorted before they can be returned to the manufacturer for reimbursement. Some retailers perform this task but most often a professional clearing house does this for a fee. The manufacturer must pay for the promotion cost on the coupon plus a handling fee to cover the expense of sorting, counting, storing and transporting the coupons. In addition, retailers incur a cost associated with the value of the discount and the time between when the consumer receives the discount and the retailer is reimbursed by the manufacturer. Coupon redemption and reimbursement systems involving paper transfers also provide opportunities for fraud. That is, coupons can be presented for reimbursement but not presented in conjunction with the purchase of the product identified on the coupon. The manufacturer is unable to determine if a group of sorted coupons presented for reimbursement by a retailer were in actuality redeemed by consumers.

Presently, some grocery store chains are now introducing "clipless coupons" into their weekly advertising circulars. These are promotional documents are redeemed without the need to cut out a coupon. Instead, the consumer applies for and receives a card with a machine readable bar code that identifies the cardholder. The card is scanned or an identity code is keyed in at the checkout register and a discount is applied against the purchase price of any product purchased that are advertised in the circular as eligible for a discount. Among the many shortcomings associated with such systems is the need to have consumers register for a card at the store before any business can be transacted. Moreover, these cards are not configured to be used with a system which is capable of accepting a number of different card or discount flyers published by entities other than the store itself. Furthermore, redemptions taken from such offers are limited to only those consumers who apply for and receive an encoded identification card. Moreover, clipless coupon type programs utilize generic advertising circulars that are not encoded to identify a specific recipient. This is because the encoded cards utilized with such "clipless coupon systems" are not associated with the delivery of an advertising circular to an intended recipient. Such systems fall short of placing on an advertising vehicle, such as, a mailed circular or booklet, redemption identification information about the recipient of the advertising. Mailing of incentive advertising to a broad general population or a targeted demographic population is preferable to the more limited population of people who apply for an identity card at a store.

Advertising mailed to the general population is desirable because it can draw response from the broad general population or a targeted demographic population, rather than the more limited population of people who apply for an identity card. The identity of the purchaser, who received the advertising circular, as previously discussed, could then be traceable. This is important because product manufacturers place a tremendous value on statistics and market research that characterizes the people who purchase particular products. With this information, a manufacturer can more efficiently manage advertising expenditures by directing promotional advertising toward people most likely to buy a product rather that to those in the broad population who may or may not purchase the product. Ideally, if the identity of the household(s) or individual(s) who have actually purchased a particular product could be determined, incentive advertising could be sent directly to that household or individual to induce additional purchases of that product, a related product, or a competitive product. Likewise, this information would greatly help a manufacturer that is introducing a new product or a variation e.g. "extension" on an existing product by allowing the manufacturer to promote the new item directly to established customers of the original product.

Accordingly, it is an object of the present invention to enable expeditious reimbursement of retailers for price discounts extended to consumers without the necessity of sorting, storing and transporting of paper coupons.

It is yet another object of the present invention to record and store in a database file referenced by purchaser identity or residence the purchases made by an individual and to use this database file to study purchasing habits of that person for marketing purposes.

It is another object of the invention to provide a database file of all incentive discount promotion products purchased by an individual, household or both, which database file may further include all products purchased, in addition to those for which an incentive discount was earned.

A further object of the invention is to provide incentive advertising and an electronic redemption, validation and reimbursement system that eliminates the need for individual paper coupons.

Yet still a further object of the invention is to provide a system and method of the aforementioned type wherein items offered for discount are debited and the debit amount is stored in a database file and this file is used by the store to effect reimbursement using electronic transfer of the data.

It is another object of the present invention to provide an advertising vehicle, such as, a mailed circular brochure or flyer, having identification information on the recipient, hence eliminating the need for consumers to apply for an identity card.

It is a further object of the present invention to provide a discount offer flyer which can draw response from the broad general population or a targeted demographic population rather than the more limited group of people who apply for an identity card.

A still further object of the invention is to provide an advertising circular which is capable of presenting the value of any discounts issued, a list of discount eligible items purchased, and a list of all items purchased so as to be recordable in appropriate database files by utilizing the machine readable UPC bar code on each product purchased and a machine readable redemption identification indicia on the advertising vehicle presented with the items purchased.

A further object of the invention is to provide an advertising flyer which significantly reduces the potential for fraud by utilizing electronic redemption and reimbursement and ties each redemption to a specific household, if not an individual.

Still a further object of the invention is to provide a combination advertising medium containing discount offers with an electronically readable redemption identification indicia.

It is yet another object of the present invention to provide an incentive discount promotion offer processing system that obviates the need to manually process and sort coupons after redemption.

Another objective of the present invention is to provide a method of validating incentive discount promotion offers distributed to consumers by electronically comparing products actually purchased with the product indemnification effected by the identifying coding on each item.

Still another object of the present invention is to provide a system by which manufacturers can expeditiously reimburse retailers for the value of incentive discounts rendered to consumers.

It is an object of the present invention to provide retailers with a database or access to a network that contains redemption information for each incentive discount promotion offer that appears in at least one advertising circular.

Another objective of the present invention is to correlate using the UPC codes of purchased products with the identity or address or both of the individual purchasing the products to enable utilization of this information for statistical and marketing purposes, such as, but not limited to, market research or the creation of highly focused and individualized consumer advertising and incentive promotions.

SUMMARY OF THE INVENTION

The present invention resides in a method for redeeming discount offers comprising the steps of providing a circulation medium and providing with said medium indicia which includes a machine readable identification code and causing said medium to be distributed to potential users. The identification code is associated with data identifying items which are to be offered at a discount provided as part of the medium. The data is stored in memory in a data base. Means is provided for reading the code provided on the circulation medium along with other means associated with the code reading means for tabulating sales of items so that any discount corresponding to an item listed in said data is deducted from the price of the item in the tabulation. The code reading means is used to identify said code provided on said medium and said means for tabulating items is used to obtain a price for the involved item. A discount is debited against the purchased item if the involved item is listed as part of the data identifying an item as qualifying for a discount as called for by the identification code of a circulation medium. The invention further resides in a method which employs the steps of the method described above, and further causes the recordation of purchases by the recipient of the medium whereby such recordation is used to establish market trends of the recipient.

BRIEF DESCRIPTION OF THE DRAWINGS

FIG. 4 is a schematic view showing in detail the customer reference memory structure of FIG. 2.

DETAILED DESCRIPTION OF THE PREFERRED EMBODIMENT

Figure 1:
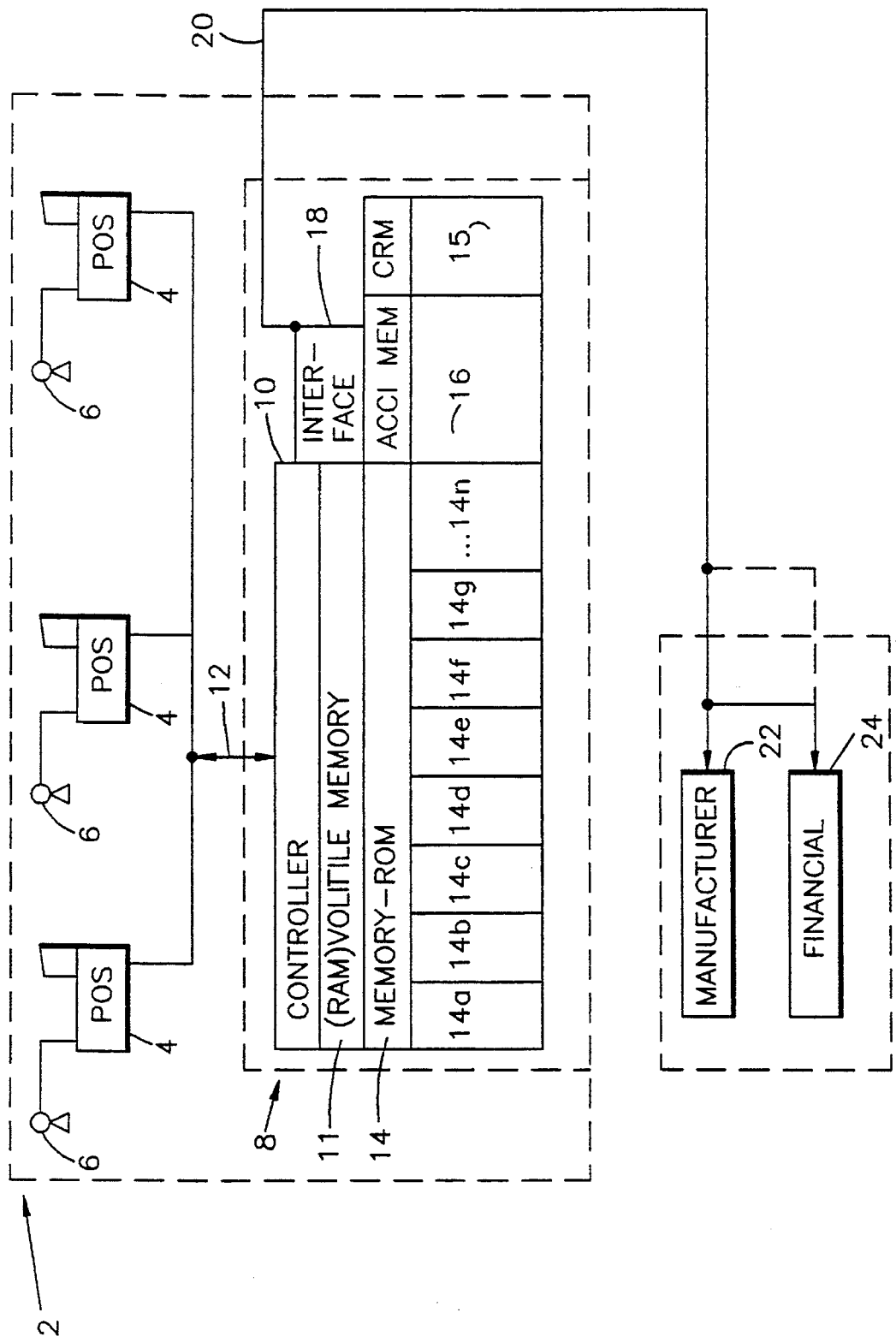
FIG. 1 is a schematic view of the system of the invention.

FIG. 1 shows the system embodying the present invention identified generally as 2. The system includes one or a plurality of point of sale machines (POS) 4,4, each having an associated scanning device 6,6 which is connected to each point of sale machine as a means for reading machine readable coding, such as UPC bar codes or the like, which have been printed on products. Each point of sale machine is linked to a main computer 8 which includes a controller 10 responsible for managing the data which is input to the system through the point of sale machines 4,4 as part of the normal transactions of the store. The point of sale machines are standard readily available machines each having a microcomputer unto themselves which is capable of communicating in real time with the main computer 8 of the network. The point of sale machines are typically those which are found at large retail grocery store environments, but nevertheless could be ones found in a smaller applications, such as in a small local neighborhood store. The main computer 8 is linked to the point of sale machines by a standard communications cable system 12 along which data and other commands are transported between machines. The controller 10 includes a read only memory (ROM) having a plurality of address locations 14(*a*) through 14(*n*) each corresponding to one discount program offered to the customer and identified by a particular code. The controller 10 is also linked to an account memory 16 provided for the purpose of recording discounts on items against manufacturers offers for subsequent credit by the appropriate manufacturer and/or financial institution. Also provided as part of the controller 10 and linked thereto, is a customer reference memory 15 provided for the purpose of recording the name or residence address of a purchaser and for recording his or her transactions. As such, the controller 10 may be provided with an external interface 18 connected with an appropriate data transmission line 20 in turn connected directly to either a manufacturer 22 or its financial institution 24 or a designated intermediary company or entity for the purpose of crediting the store with the value of redeemed coupons that have been recorded in the account memory 16.

Figure 2:
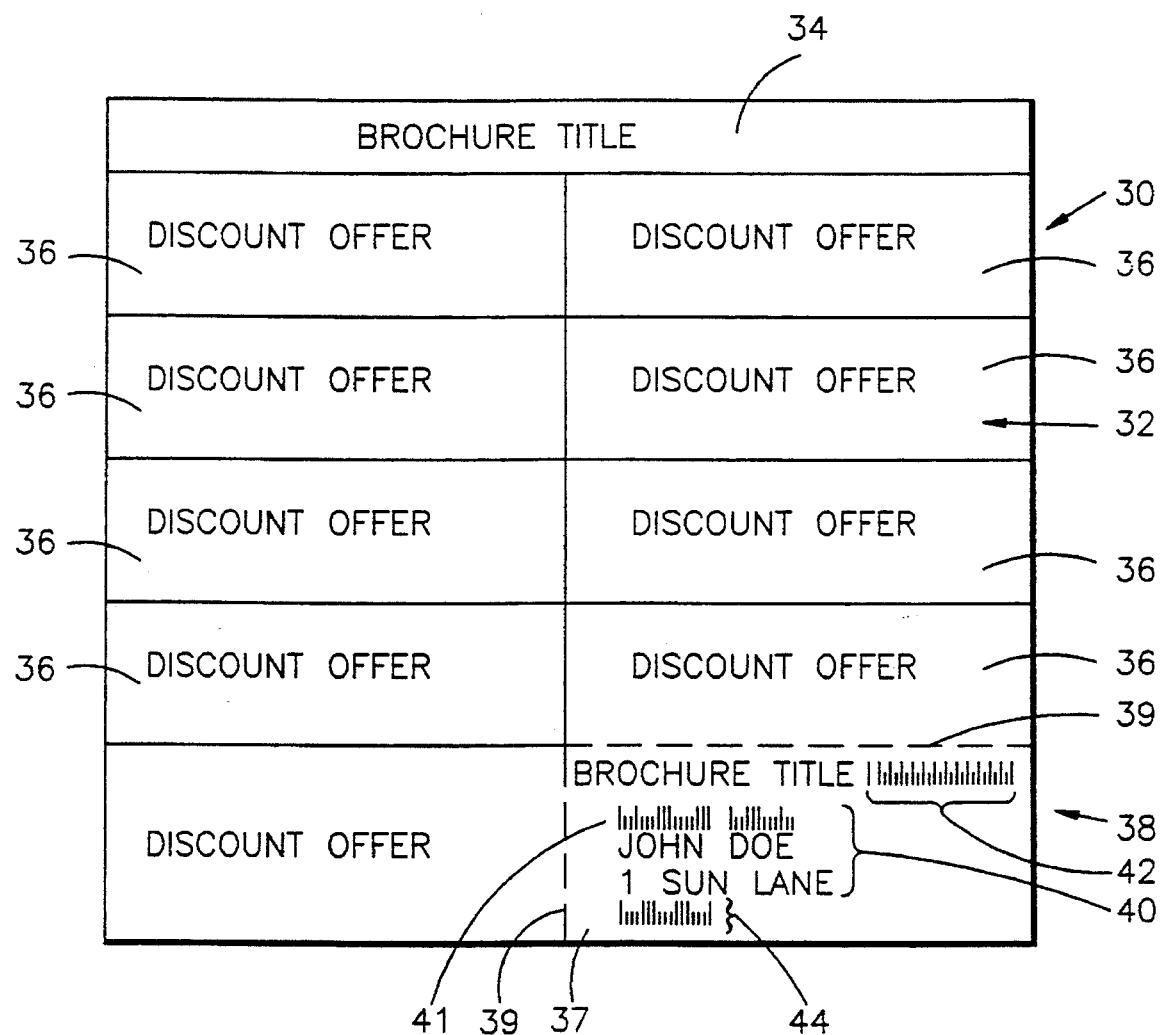
FIG. 2 is a plan view of the front page of discount offer brochure useable with the system shown on FIG. 1.

Referring now to FIG. 2, and in particular to the vehicle by which discount offers are distributed to market area homes and residences, it should be seen that the vehicle embodying one aspect of the invention can be a single sheet or a multi-sheet item, e.g. a brochure indicated generally as 30, having a front page 32 on which is printed the brochure title 34 along with various descriptions of discount offered items each separately displayed in associated areas 36,36. In one area of the front page 32 of the flyer or brochure 30 is provided identification indicia means 38 which supplies both visually readable indicia, such as the recipient's name and address 40, a bar code indicia 42 which identifies in machine readable code the brochure title which is readable by the system 2 of the invention, and a POSTNET postal machine readable code 44 which is used by the United States Postal Service to facilitate delivery of the brochure panel 30. In the preferred embodiment, the indicia means 38 further includes a second barcode indicia 41 which is readable by the system 2 of the invention and which identifies the address of the user. This code is provided in addition to the POSTNET code 44 because the code 41 would be readable by a greater variety of scanning devices than those presently commercially available for reading POSTNET codes. It should nevertheless be noted that the POSTNET (Postal Numeric Encoding Technique) eleven-digit delivery point bar code system can be used for automated delivery to each of the over 115 million delivery points in the United States. Alternative services, for example, United Parcel Service (UPS) or FedEx, could also deliver the advertising circular. In the event an alternative service were used, machine readable delivery coding conforming to that organization's requirements would be employed. Additionally, the indicia means 38 need not be printed directly onto the face of the circular, but rather can be preprinted in label, paper or polymeric or magnetic strip and applied, usually by a releasable adhesive, to the flyer or circular after it is printed.

The indicia 42 representing the brochure type is a machine readable code which is capable of being scanned by one of the illustrated scanners 6,6. This indicia, is identifiable by automated retail point-of-sale (POS) checkout terminals in retail stores. The indicia in the preferred embodiment takes the form of a Universal Product Code (UPC) bar code. This redemption identification indicia could correlate with the buying habits of those at the delivery address on the circular and, optionally, could include the name and/or address of the person, household, business, or organization intended to receive the advertising. However, at the very least, the indicia must include a code which identifies the flyer so that the designated offers which are set forth on that flyer can be called up by the computer 8 when the flyer is presented at the point of sale station.

In addition to the flyer identifying indicia, the desired goal of correlating the purchaser with the items bought, may alteratively be effected by providing a unique indicia, such as, an alphanumeric, magnetic, or graphic code printed on the flyer in lieu of the bar code 41 containing such data, and such substitute indicia would be recorded in a database for reference and access as needed. Furthermore, existing identification information could make up part of the indicia for an individual, for example, an individual's credit card number, a person's driver's license number, and a membership number from an organization such as the American Automobile Association or the American Association of Retired People, all would serve as a means for identifying a purchaser. Also, the redemption indicia while shown in the form of a bar code, could alternatively take the form of a magnetic strip, an alphanumeric, or a graphic which is specific to a given advertising circular. Regardless of the type of indicia used, it should be understood that the purpose of providing POS machine readable redemption identification indicia relating to a specific advertising circular, is ultimately to address a file in the POS machine containing the products or services offered under a that circular and to record the identity of each recipient of that circular who redeems at least one item offered in the circular along with a listing of all items purchased during that transaction. Also, on a periodic basis, or at least in advance of the flyer being circulated, the maker of the flyer will provide the retail store with an updated file identifiable by a new code to be downloaded into the POS machine.

The code represented by the indicia 42 when read by the system through one of the scanners 6 identifies an address in the memory means 14 which corresponds to a current discount circular. Amongst the identifying data associated with this address location would be (a) the items identified by inventory number to which a discount offer has been made; (b) the expiration date of the offer for each of the items that are listed. It is a feature of the invention to use a different machine readable code for each different brochure which is currently in circulation and which is redeemable at that retail store. As such, the system of the invention provides for multiple identification and processing of various published brochures effected by scanning the indicia 42 of the flyer. The brochure/flyer is uniquely constructed such that the area on which the indicia 42 is printed is perforated along lines 39,39 so as to define a detachable card portion or carry piece 37 of the flyer. If desired, the card may be detached from the remaining offer sheet and/or brochure and be carried by the holder to the point of sale machine where it may be produced by the holder and subsequently scanned without need of the user carrying around the entire brochure.

Figure 3A:
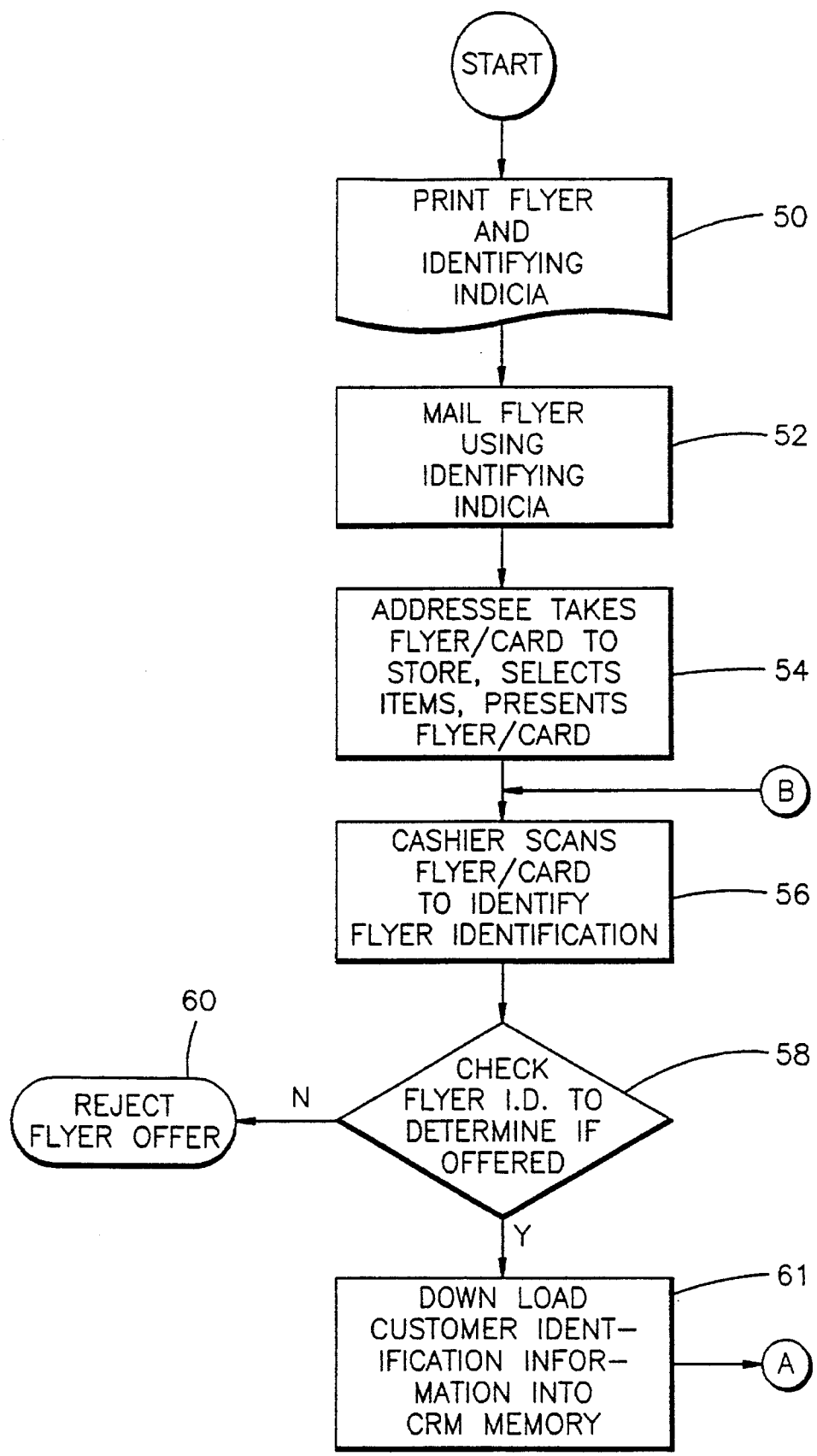
FIGS. 3a, 3b and 3c when taken together illustrate a flow chart embodying the method of the present invention.
Figure 3B:
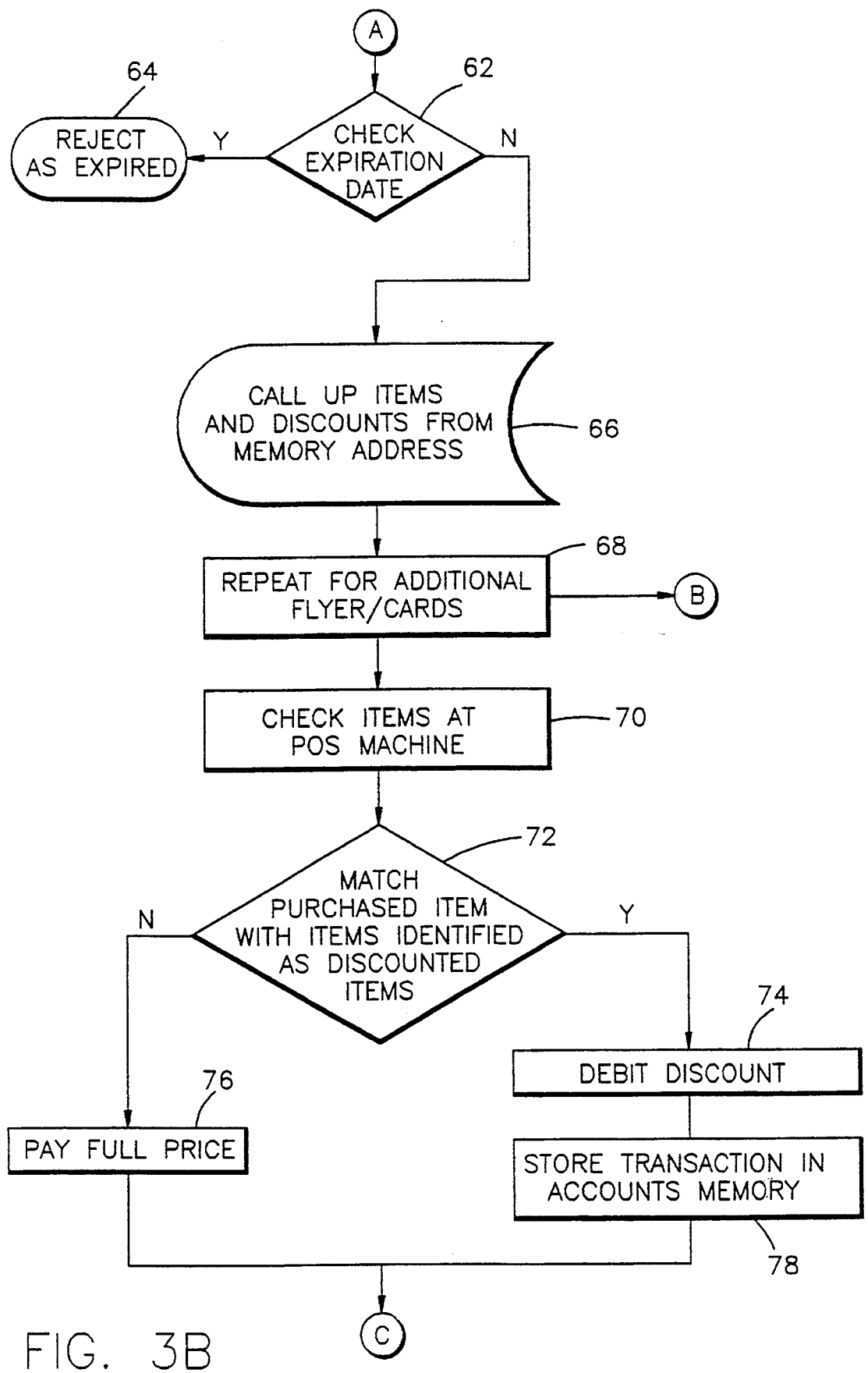
Figure 3C:
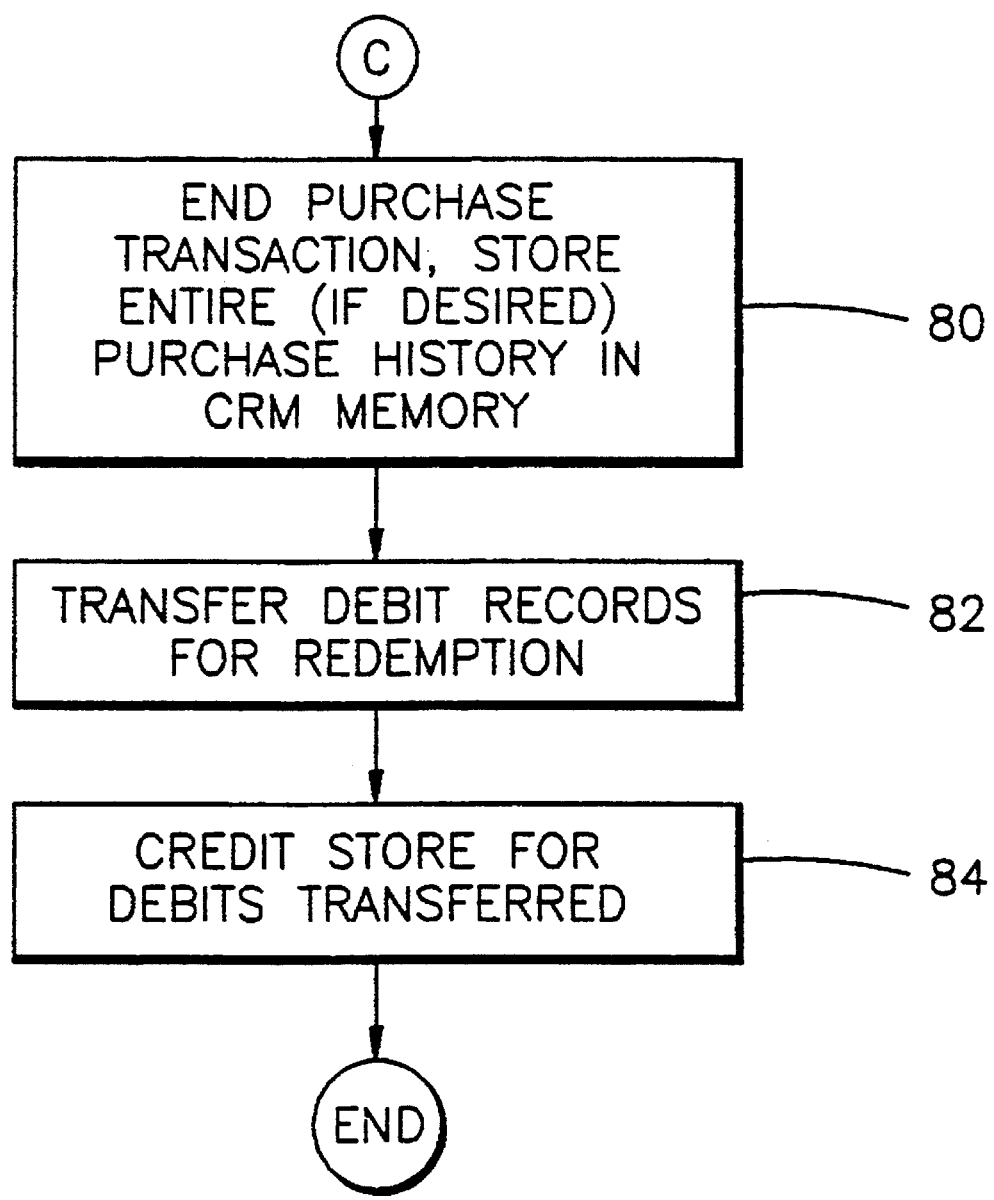

Referring now to FIG. 3, and to the method by which redemption using the system of the present invention is accomplished, it should be seen that the process starts by the printing of the brochure flyer 30 in a standard printing operation. In this printing process, the brochure title is printed in alphanumerics on the card portion 37 along with the corresponding identification indicia 42 which is the numeric machine readable code needed for the computer to identify and access the appropriate location in memory where items offered for discount are stored. (Step 50) Next, the multi-sheet brochure or flyer 30 is mailed or delivered to the recipient using the printed address identification indicia disposed on the card portion 37. (Step 52) Once the flyer 30 is received by the recipient, he or she can then simply detach the carry card portion 37 from the remainder of the advertising vehicle or leave the card undetached from the brochure so that convenient reference can be made to the discount offers while shopping. Nonetheless, it should be understood that the discount offers which are printed on the brochure are not cut from the brochure, but remain there only for purposes of allowing the holder to identify what purchases the computer will be recognizing as discounts once the identifying indicia 42 is scanned. As such, once the holder gathers the items purchased, he or she presents the card 41 either undetached as part of the flier or brochure 30, or presents it separately as a card in the case where the holder does not find it necessary to have a printed listing of the specific items offered in the given brochure in front of him or her. (Step 54) Thereafter, using the scanning means 6,6 of each of the point of sales machines, the operator scans the brochure title indicia 42 and the user identification indicia 41 so as to identify which if any memory address location, e.g. 14(*a*), 14(*b*), 14(*c*), . . . 14(*n*), the involved brochure is represented by. (Step 56) With the identification code read, a check is conducted to ensure that the brochure scanned is one which is located in memory. (Step 58) If no address can be found for the involved identification code, an error signal (step 60) is issued. However, if the identification code is accepted as valid, then the information contained in the identification indicia 41 is released from a buffer and downloaded to the customer reference memory 15 (Step 61) where this information will automatically serve to identify a file created under the name and/or address of the addressee of the flyer/card. This information is then used in future market research in accordance with one aspect of the invention. Items listed in the memory location for that code address are then downloaded into temporary memory, such as, at location 11 of the controller 10. Depending on the type of offers which are being made, the identification code will bear an expiration date for all the items listed on the flyer, or each discount offer will bear a separate expiration date. (Step 62) Notwithstanding, in either case, the internal clocking system of the controller 10 checks these dates to insure that expiration has not occurred. In the event that such expiration has occurred, ether the entire offer sheet is considered invalid or individual offers are separately held invalid by expiration and an error signal is generated with an appropriate message that the offer has expired. (Step 64) In some instances it may be desirable to limit the number of times an incentive promotion offer can be redeemed. Various means can be utilized to accomplish this. The cashier at the POS terminal can mark, tear or otherwise destroy the redemption identification indicia section of the circular. Likewise, the POS terminal can be programmed to electronically void the offer(s) after crediting a discount. It is also possible to incorporate a magnetic stripe or similar recording device into the redemption identification indicia and program the POS terminal to record appropriate data onto the stripe that will limit or invalidate future discounts on purchases of designated items.

The data representing items contained at the memory address corresponding to the particular flyer are called up from memory 14 and are stored in temporary memory (Step 66). The data representing these items and their associated discounts are held in temporary memory such that the purchased items when checked at the point of sale terminal for quantity, size and amount can be automatically awarded a discount if appropriate. A feature of the invention is to provide a system which is capable of allowing many different offers programs to be stored at the various memory locations 14(*a*) . . . 14(*n*) for subsequent accessing. Thus, it should be understood that the process of scanning a redemption identification indicia, such as indicia 42, and thereafter calling up the associated products and discounts is repeatable for each different flyer which may be presented by the purchaser so that the data downloaded into volatile memory 11 may be the aggregate of products and associated discounts taken from a plurality of promotional flyers. (Step 68) The items to be purchased are then processed by the cashier. (Step 70) The POS system which can be used for this purpose can either be a standard point of sale machine wherein items are entered using one of the system scanners 4,4, or by using a keypad entry system into which imputed data is translated into the numerically readable machine code. An item by item check is made of the purchased items against those which are identified in volatile memory 11 to determine if a match exists. (Step 72) If an item is identified as being one presently offered by the involved offer brochure, then a discount is rendered by a debiting of the checkout price. (Step 74) If no such match is made, then full price is rendered. (Step 76) In the case where a debit is made against a purchased item, then this debited amount is stored in the account memory 16 each time a debit is executed. (Step 78)

Once the transaction is complete and all debits are made against the full price of items, these debits are then stored in the account memory 16. Further, depending on the amount of data which is to be recovered, either the entire transaction can be recorded and stored in the CRM memory 15 or only the record of items purchased with discounts offered under one or more flyers used in the transaction. (Step 80). In either case, as best illustrated by the schematic of FIG. 4, it should be understood that by using either the scanned POSTNET indicia 44 or the barcode identifying indicia 41, a file name 88 is created using the information of that indicia, and this file receives information relating to the items purchased under the identity of the identifying indicia 41, thereafter entered into each file as data 90. These data files are stored at memory location 15 until such time that it is decided that enough data is collected, whereupon, the data is either transferred to a storage medium such as a, C.D. ROM, or tape, or directly electronically transferred from the memory 15 via the interface means 18 to a remote location through a line similar to line 20. The data 90, being arranged according to the identity or residence of the purchaser of items purchased during the transaction, allows market analysis to be conducted on the buying habits of a household, person, or market area. This information is also important for purposes of tracking customer purchasing patterns which may be sold to various marketing establishments. For this purpose the identification indicia 42 may have a identification suffix appended to it which gives minimally the address of the addressee shown at the indicia 40. It is likewise possible to use the U.S. Postal Service mailing code 44 as a means for identification of the purchaser through post purchase tracking.

Once the data is collected in the account memory 16 it is then electronically transferred for redemption purchases. (Step 82) For this purpose an external interface means 18 is provided for electronically connecting the manufacturer 22 of a given product or its financial institution 24 or a designated intermediary company or entity which may in real time credit the store with the value of the redeemed offers that have been recorded into the account memory 16. Such linkage can be done through conventional phone line transmission or other communication transmission technique such as shown at 20 or can be sent to the manufacturer or appropriate financial institution or designated intermediary company or entity on a storage medium such as a disk or CD ROM medium. (Step 84)

By the foregoing, an improved method of product redemption has been disclosed by way of the illustrated embodiment. However, numerous modifications and substitutions may be had without departing from the spirit of the invention.

I claim:

1. A method for redeeming discount offers comprising:

providing a circulation medium and providing said medium with indicia which includes a machine readable identification code;

causing said medium to be distributed to potential users;

associating said identification code with data identifying items which are to be offered at a discount provided as part of said medium and storing said data in memory in a data base so as to be addressable by said identification code;

providing means for reading said identification code provided with said circulation medium;

providing means associated with said code reading means for tabulating sales of items so that any discount corresponding to an item listed in said data is deducted from the price of the item in the tabulation; and using said reading means to identify said code provided with said medium and using said means for tabulating items to obtain a price for the involved item and to cause a discount to be debited against the purchased item if the involved item is listed as part of said data identifying an item as qualifying for a discount as called for by the data base data defined by the identification code of the medium.

2. A method as defined in claim 1 further characterized by providing said circulation medium as an offer brochure and providing said machine readable identification code on said brochure so that the code identifies the brochure title and references those items identified in the data base which are offered as discounted products.

3. A method as defined in claim 2 further characterized by the step of providing means for tabulating sales of items including using said reading means to scan product codes on the items purchased to identify the purchased item and cause the price of the item to be entered into the tabulation.

4. A method as defined in claim 3 further characterized by providing said read only memory with address locations corresponding respectively to different discount offers.

5. A method as defined in claim 4 further characterized in that in each of said memory address locations is located a date identifying the expiration of offers on products for which a discount is offered.

6. A method as defined in claim 2 further characterized by the step of using a key pad entry means to manually input the purchased item into the tabulating means.

7. A method as defined in claim 3 further characterizes by said controller being provided with an account memory within which discounts which have been debited against purchased items identified in said data are stored.

8. A method as defined in claim 4 further characterized each of said items in at least one of said memory locations has an expiration date associated with it.

9. A method as defined in claim 4 further characterized by said data including an expiration date for each item offer listed in each of said memory address locations.

10. A method as defined in claim 9 further characterized by providing said controller with an interface means for connecting said account memory with a remote redemption facility.

11. A method as defined in claim 10 further characterized by using said interface means to transfer debit amounts stored in said account memory to the appropriate manufacturer or financial institution or designated intermediary company or entity associated with each discount which is offered.

12. A method as defined in claim 1 further characterized by providing as part of said identification code identification indicia means on said medium for identifying the addressee of said medium;

using said code reading means to read the identification indicia means and to create a data file identified by the information in said identification indicia means; and using said means for tabulating items to record at least the items caused to be given a discount in said data file identified by the identification indicia means of the user.

13. A method as defined in claim 12 further characterized by said identification indicia means being a standardized bar code identifying at least the address of the holder of the medium.

14. A method as defined in claim 12 further characterized by said identification indicia means being a POSTNET bar code identifying at least the address of the holder of the medium.

15. A method as defined in claim 12 further characterized by using each data file identified by said identification indicia means as a means to study buying habits of the recipient of the medium.

16. A system for redeeming discount offers comprising:

a circulation medium;

said medium having indicia which includes a machine readable identification code;

means for distributing said medium to potential users;

said identification code being associated with data identifying items which are to be offered at a discount provided as part of said medium;

memory means for storing said data in memory in a database so as to be addressable by said identification code;

means for reading said identification code provided with said circulation medium;

means associated with said code reading means for tabulating sales of items so that any discount corresponding to an item listed by said data in said memory means is deducted from the price of the item in the tabulation; and said reading means identifying said code printed on said medium and said means for tabulating items being used to determine a price for the involved item and to then cause a discount to be debited against the purchased item if the involved item is listed as part of said data identifying an item as qualifying for a discount as called for by discounts defined by the identification code of a circulation medium.

17. A method of tracking customer purchasing habits comprising:

providing a circulation medium and providing said medium with indicia including a machine readable identification code means;

causing said medium to be distributed to potential users;

associating said identification code means with the addressee of the distributed circulation medium and with data identifying at least one item to be offered at a discount;

providing means for reading said identification code means provided with said circulation medium;

using a code reading means to read the identification code means and to create a data file identified by the information in said identification code means;

providing means for tabulating items and for recording the items purchased by the bearer of the circulation medium and providing means for calculating the at least one discount on the item offered at discount by said identification code means; and tabulating items purchased and storing a record of the tabulated items in said data file identified by the identification code means thereby enabling tracking of purchasing habits of individuals who receive and use the circulation medium.

18. A method as defined in claim 17 further characterized by providing said identification code means as indicia which identifies the address of the recipient.

19. A method as defined in claim 17 further characterized by providing said identification code means as indicia which identifies the name of the recipient.

20. A method as defined in claim 17 further characterized by providing said identification code means as indicia which identifies the name and address of the recipient.

\* \* \* \* \*

US005612527C1

(12) EX PARTE REEXAMINATION CERTIFICATE (7467th)
United States Patent
Ovadia

(10) Number: US 5,612,527 C1
(45) Certificate Issued: Apr. 27, 2010

(54) DISCOUNT OFFER REDEMPTION SYSTEM AND METHOD

(75) Inventor: Victor A. Ovadia, West Hartford, CT (US)

(73) Assignee: Motivation Innovations LLC, Enfield, CT (US)

Reexamination Request:
No. 90/009,445, Apr. 1, 2009

Reexamination Certificate for:
Patent No.: 5,612,527
Issued: Mar. 18, 1997
Appl. No.: 08/414,281
Filed: Mar. 31, 1995

(51) Int. Cl.
*G06Q 30/00* (2006.01)

(52) U.S. Cl. ............... 705/14.38; 235/375; 235/383; 235/385; 705/14.25; 705/14.53; 705/20
(58) Field of Classification Search ............. None
See application file for complete search history.

(56) References Cited

U.S. PATENT DOCUMENTS

| | | | |
|---|---|---|---|
| 3,959,624 A | 5/1976 | Kaslow | |
| 4,124,109 A | 11/1978 | Bissell et al. | |
| 4,186,438 A | 1/1980 | Benson et al. | |
| 4,195,864 A | 4/1980 | Morton et al. | |
| 4,540,880 A | 9/1985 | Hipko | |
| 4,554,446 A | 11/1985 | Murphy et al. | |
| 4,723,212 A | 2/1988 | Mindrum et al. | |
| 4,751,641 A | 6/1988 | Collins, Jr. et al. | |
| 4,752,675 A | 6/1988 | Zetmeir | |
| 4,791,281 A | 12/1988 | Johnsen et al. | |
| 4,821,186 A | 4/1989 | Munakata et al. | |
| 4,841,442 A | 6/1989 | Hosoyama | |
| 4,882,675 A | 11/1989 | Nichtberger et al. | |
| 4,908,761 A | 3/1990 | Tai | 705/14 |
| 4,910,672 A | 3/1990 | Off et al. | 705/14 |
| 4,949,256 A | 8/1990 | Humble | |
| 4,957,311 A | 9/1990 | Geisenheimer | |
| 5,008,519 A | 4/1991 | Cunningham et al. | |
| 5,052,718 A | 10/1991 | Gold | |
| 5,053,955 A | 10/1991 | Peach et al. | |
| 5,053,957 A | 10/1991 | Suzuki | |
| 5,056,019 A | 10/1991 | Schultz et al. | |
| 5,057,915 A | 10/1991 | Von Kohorn | |
| 5,128,520 A | 7/1992 | Rando et al. | |
| 5,176,224 A | 1/1993 | Spector | |
| 5,185,695 A | 2/1993 | Pruchnicki | |
| 5,192,854 A | 3/1993 | Counts | |
| 5,245,533 A | 9/1993 | Marshall | |
| 5,249,044 A | 9/1993 | Von Kohorn | |
| 5,256,863 A | 10/1993 | Ferguson et al. | |

(Continued)

FOREIGN PATENT DOCUMENTS

| | | |
|---|---|---|
| CA | 2098329 | 3/1994 |
| EP | 0 512 509 | 12/1992 |
| WO | WO 92/10371 | 6/1992 |
| WO | WO 92/14213 | 8/1992 |
| WO | WO 94/23383 | 10/1994 |
| WO | WO 94/27231 | 11/1994 |
| WO | WO 95/04491 | 2/1995 |
| WO | WO 95/30199 | 11/1995 |

OTHER PUBLICATIONS

McGraw–Hill Dictionary of Scientific and Technical Terms, Fourth Edition, 1989, p. 1572.

*Primary Examiner*—Matthew Heneghan

(57) ABSTRACT

A system for redeeming discount offer flyers which are mailed, handed or otherwise distributed to potential customers, provides identifying indicia on the offer flyer/circulars which is used by a point of sale machine to identify items which are offered at a discount and then apply an appropriate credit to the purchased items. The system further resides in a method of tracking purchasing habits of individuals who receive and use the discount offer flyer by creating a data base file identified by the user name or residence address for items so purchased with the flyer/circular program.

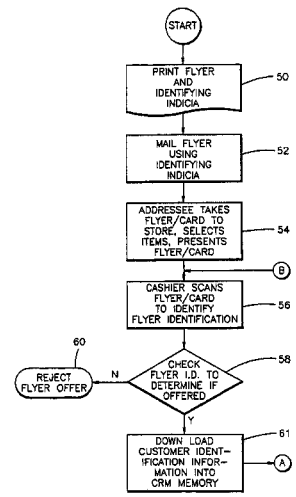

U.S. PATENT DOCUMENTS

| | | | |
|---|---|---|---|
| 5,285,278 A | 2/1994 | Holman | |
| 5,287,181 A | 2/1994 | Holman | |
| 5,313,664 A | 5/1994 | Sugiyama et al. | |
| 5,314,176 A | 5/1994 | Schmitt | |
| 5,353,218 A | 10/1994 | DeLapa et al. | 364/401 |
| 5,368,129 A | 11/1994 | Von Kohorn | |
| 5,369,571 A | 11/1994 | Metts | |
| 5,380,991 A | 1/1995 | Valencia et al. | |
| 5,401,950 A | 3/1995 | Yoshida | |
| 5,424,524 A | 6/1995 | Ruppert et al. | |
| 5,459,306 A | 10/1995 | Stein et al. | |
| 5,463,209 A | 10/1995 | Figh et al. | |
| 5,481,094 A | 1/1996 | Suda | |
| 5,483,049 A | 1/1996 | Schulze, Jr. | |
| 5,488,423 A | 1/1996 | Walkingshaw et al. | |
| 5,501,491 A | 3/1996 | Thompson | |
| 5,557,721 A | 9/1996 | Fite et al. | |
| 5,568,599 A | 10/1996 | Yoshino et al. | |
| 5,581,064 A | 12/1996 | Riley et al. | |
| 5,599,052 A | 2/1997 | Van Davelaar | |
| 5,642,279 A | 6/1997 | Bloomberg et al. | |
| 5,675,662 A | 10/1997 | Deaton et al. | |
| 5,708,782 A | 1/1998 | Larson et al. | |
| 5,805,831 A | 9/1998 | Fuyama | |
| 5,822,735 A | 10/1998 | De Lapa et al. | |
| 5,832,457 A | 11/1998 | O'Brien et al. | |
| 6,328,399 B1 | 12/2001 | Wen | |
| 6,697,785 B2 | 2/2004 | Dixon, III et al. | |
| 6,837,436 B2 | 1/2005 | Swartz et al. | |
| 2003/0135414 A1 | 7/2003 | Tai | |
| 2004/0046997 A1 | 3/2004 | Tsai | |

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–16 is confirmed.

Claim 17 is determined to be patentable as amended.

Claims 18–20, dependent on an amended claim, are determined to be patentable.

New claims 21–39 are added and determined to be patentable.

17. A method of tracking customer purchasing habits comprising:
   providing a circulation medium and providing said medium with
   indicia including a machine readable identification code means;
   causing said medium to be distributed to potential users;
   associating said identification code means with the addressee of the distributed circulation medium and with data identifying [at least one item] *items* to be offered at a discount;
   providing means for reading said identification code means provided with said circulation medium;
   using a code reading means to read the identification code means and to create a data file identified by the information in said identification code means;
   providing means for tabulating items and for recording the items purchased by the bearer of the circulation medium and providing means for calculating the at least one discount on the item offered at discount by said identification code means; and
   tabulating items purchased and storing a record of the tabulated items in said data file identified by the identification code means thereby enabling tracking of purchasing habits of individuals who receive and use the circulation medium.

*21. A method as defined in claim 1, further characterized by providing said circulation medium as an offer brochure and providing said machine readable identification code on said brochure so that the code identifies the brochure and references those items identified in the database which are offered as discounted products.*

*22. A method as defined in claim 21, wherein the step of providing means for tabulating sales of items includes using said reading means to scan product codes on the items purchased to identify the purchased item and cause the price of the item to be entered into the tabulation.*

*23. The method of claim 1, wherein said storing step includes storing at least a portion of said data in a volatile memory.*

*24. The method of claim 1, wherein said storing step includes storing at least a portion of said data in a read only memory.*

*25. The method of claim 1, wherein storing said data includes accessing said database on a computer that is linked to said means for tabulating.*

*26. The method of claim 1, wherein storing said data includes accessing said database using said means for tabulating.*

*27. The method of claim 1, wherein said using step further comprises linking said means for tabulating to said database via a communications cable.*

*28. A method as defined in claim 1, wherein the memory includes a read only memory and an account memory.*

*29. A method as defined in claim 1, further including the step of providing said memory with address locations corresponding respectively to different identification codes.*

*30. A method as defined in claim 29, further characterized in that in each of said memory address locations is located a date identifying the expiration of offers on products for which a discount is offered.*

*31. A method as defined in claim 29, further characterized in that each of said items in at least one of said memory address locations has an expiration date associated with it.*

*32. A method as defined in claim 29, further characterized by said data including an expiration date for each item listed in each of said memory address locations.*

*33. A method as defined in claim 32, further characterized by providing an interface means for connecting said memory with a remote redemption facility.*

*34. A method as defined in claim 33, further characterized by using said interface means to transfer debit amounts stored in said memory for the purpose of a credit for any discount debited against the purchased item.*

*35. A method as defined in claim 32, further characterized by providing an interface means for connecting an account memory with a remote redemption facility.*

*36. A method as defined in claim 35, further characterized by using said interface means to transfer debit amounts stored in said account memory for the purpose of a credit for any discount debited against the purchased item.*

*37. A method as defined in claim 1, further characterized by storing in an account memory discounts which have been debited against purchased items identified in said data.*

*38. A method as defined in claim 37, further characterized by providing an interface means for connecting said account memory with a remote redemption facility.*

*39. A method as defined in claim 38, further characterized by using said interface means to transfer debit amounts stored in said account memory for the purpose of a credit for any discount debited against the purchased item.*

\* \* \* \* \*